United States Patent [19]

Steiman

[11] 4,087,025

[45] May 2, 1978

[54] LEAKPROOF PUMP FOR HAND-HELD DISPENSERS

[76] Inventor: Wolf Steiman, 649 Springer Rd., Fairfield, Conn. 06430

[21] Appl. No.: 752,669

[22] Filed: Dec. 20, 1976

[51] Int. Cl.$^{2}$ ........................ G01F 11/00; B05B 11/02

[52] U.S. Cl. ...................................... 222/321; 222/385

[58] Field of Search ............... 222/320, 321, 383, 385; 239/333

[56] References Cited

U.S. PATENT DOCUMENTS

| | | | |
|---|---|---|---|
| 3,500,761 | 3/1970 | Clevenger et al. | 222/321 |
| 3,724,726 | 4/1973 | Susuki et al. | 222/321 |
| 4,010,874 | 3/1974 | Steiman | 222/321 |

*Primary Examiner*—Robert B. Reeves
*Assistant Examiner*—H. Grant Skaggs
*Attorney, Agent, or Firm*—H. Gibner Lehmann; K. Gibner Lehmann

[57] ABSTRACT

A leakproof pump construction for hand-held dispensers, comprising a pump cylinder, an annular piston having a hollow bore which is slightly conical, said piston being reciprocatible in the cylinder between high and low positions therein, and a hollow ducted plunger carrying the piston and extending through the bore thereof. The plunger has a side orifice and discharge passage or duct through which liquid product can flow to be dispensed from a spray head. The piston is movable between high and low positions on the plunger to control the discharge through the latter. For the non-dispensing condition, the piston seals against an internal shoulder in the cylinder while a valve head at the lower portion of the plunger seals against a cooperable valve seat on the lower body portion of the piston. The sealing surface of the valve head and the valve seat are both of conical configuration such that the valve head normally applies radially inward pressure on the walls of the piston. The action on the piston is thus a double-ended one tending to squeeze the piston radially inward to closely hug the plunger, causing the walls in the bore of the latter, especially the smaller diameter portion thereof, to sealingly embrace with added force the cylindrical wall of the plunger, and effectively preventing liquid from leaking past the two parts.

During discharge, the valve head first leaves the piston valve seat after which the plunger and piston move together as a unit. Liquid from the cylinder is forced past the piston seat and into the side orifice of the plunger to be discharged through the hollow portion thereof. By the above construction, undesirable leakage of the pump is greatly minimized.

3 Claims, 2 Drawing Figures

LEAKPROOF PUMP FOR HAND-HELD DISPENSERS

CROSS REFERENCES TO RELATED APPLICATIONS

Copending application of Wolf Steiman, U.S. Ser. No. 590,688 filed June 26, 1975 now U.S. Pat. No. 4,010,874 and entitled PUMP FOR HAND-HELP DISPENSERS.

BACKGROUND

This invention relates generally to atomizer pump constructions for small hand-held dispensers and the like, and more particularly to pumps of the type having a hollow or ducted plunger which slidably carries a hollow piston and wherein the piston is movable on the plunger between high and low positions at the times of plunger movement. U.S. Pat. No. 3,724,726 dated Apr. 3, 1973 and issued to Susuki illustrates a pump of this type.

One of the problems associated with such pumps is that leakage of liquid from the pump cylinder tends to occur, especially past the area between the cylindrical walls of the plunger and the walls of the piston bore. In the Susuki construction, the fit between the plunger and piston bore has to be sufficiently loose to enable limited sliding movement to occur between the two parts, since during initial discharge the plunger moves first to expose or uncover the side orifices adjacent the lower part of the plunger. With a sliding fit of the type indicated, there is usually a limited amount of seepage through the bore of the piston, even during non-discharge of the dispenser in the case that it is lying either on its side or upside down.

One approach to the problem, that embraced by the Susuki device, was to establish a large surface contact between the plunger and piston, to maximize the length of the path that liquid would have to travel in order to leak out. While this arrangement partially reduced leakage, problems still existed. In insuring reliable operation, such a construction is seen to rely a great deal on a proper sliding fit between the piston bore and plunger. This involves critical tolerances which are usually difficult to achieve and adhere to, especially in mass production and where plastic components are involved. Accordingly, the critical tolerances which were involved resulted in unnecessarily high fabrication and assembly costs, which in some cases made the product prohibitively expensive.

SUMMARY

The above drawbacks and disadvantages of prior pump constructions for hand-held containers are largely obviated by the present invention, which has for its main object the provision of a novel and improved especially leakproof, slidable-piston type pump characterized by few and simple parts which can be economically molded of plastic substance, and also readily assembled by unskilled personnel. The relatively few parts are easily formed to the required dimensions and tolerances without undue expense, whereby an especially low fabricating cost is had. An additional object is the provision of a pump construction which effects an improved operation and which is highly reliable over extended periods of use. A still further object is the provision of a pump as above and of the type having a plunger and hollow piston, wherein there is greatly minimized or eliminated leakage in the area between the plunger walls and the walls of the piston bore.

Another feature of the invention resides in the provision of an improved pump construction as above characterized, wherein most of the parts are of plastic having simple configurations, enabling them to be readily economically molded in simple cavities.

The above objects are accomplished by the provision of a pump construction for containers of the hand-held type, comprising a cylinder, a hollow plunger movable in the cylinder and having a central discharge passage through which liquid from the cylinder can flow, and a hollow annular piston carried by the plunger and movable in the cylinder between raised and lowered positions. The piston has a slightly conical bore with the smaller diameter portion being at the top of the piston and being slidable along and sealingly engaging the cylindrical walls of the plunger. The piston includes a skirt which engages the cylinder walls, and a body portion having a novel conical valve seat which cooperates with a valve head disposed at the bottom of the plunger and having a conical surface similar to that of the valve seat. The valve head and valve seat are so arranged that when the head engages the seat as during non-discharge of the dispenser, the head tends to squeeze the body portion of the piston radially inward thereby effecting a tighter seal of the smaller diameter portion of the piston bore with the cylindrical walls of the plunger. The upper piston end is also radially squeezed inward, giving an effective, double-action type of inward squeeze. This provides an improved seal between the piston and plunger and thereby minimizes any leakage which would otherwise tend to occur.

In operation, the plunger first moves downwardly to unseat the valve head from the valve seat on the piston, and thereafter the piston and plunger move together as a unit, with liquid from the pump cylinder being forced past the seat, into the side orifices of the plunger and out through the hollow interior thereof to a suitable spray head on a depress button of the plunger.

Other features and advantages will hereinafter appear.

Figure 1:
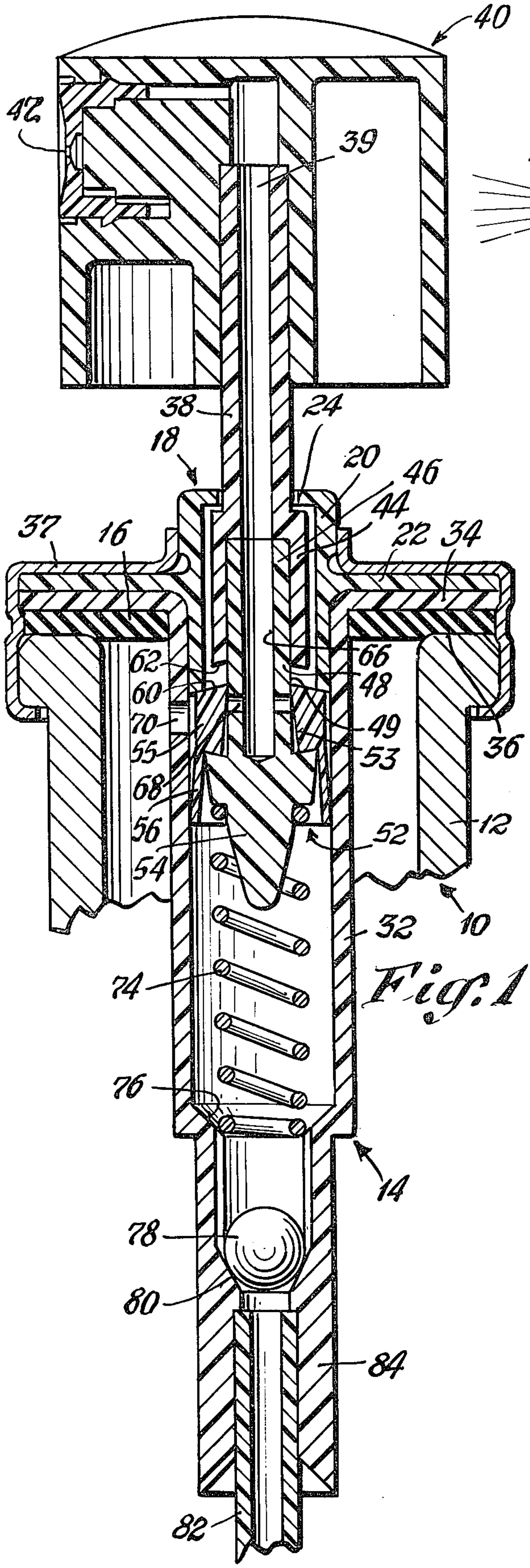
FIG. 1 is an axial sectional view of the pump construction of the present invention and the upper portion of a container therefor, greatly enlarged, the parts being shown in the raised or storage, non-pumping position.

FIG. 1 illustrates a pump construction for a dispenser of the hand-held variety, shown mounted on a container 10 having a reduced neck portion 12 to accommodate a pump assemblage generally designated 14. The assemblage includes a mounting and bearing bushing 18 having a tubular body portion 20, an annular mounting flange 22 and a stop flange 24.

A pump cylinder 32 is secured in the mouth of the container by means of an exterior annular mounting flange 34 which underlies the mounting flange 22 of the bushing 18 and is secured in place by engagement with a resilient sealing gasket 16 which bears against the top edge or rim 36 of the container 10. A ferrule 37 is crimped over the flanges 22, 34, gasket 16, and the container neck 12, as shown, all in the usual manner.

Figure 2:
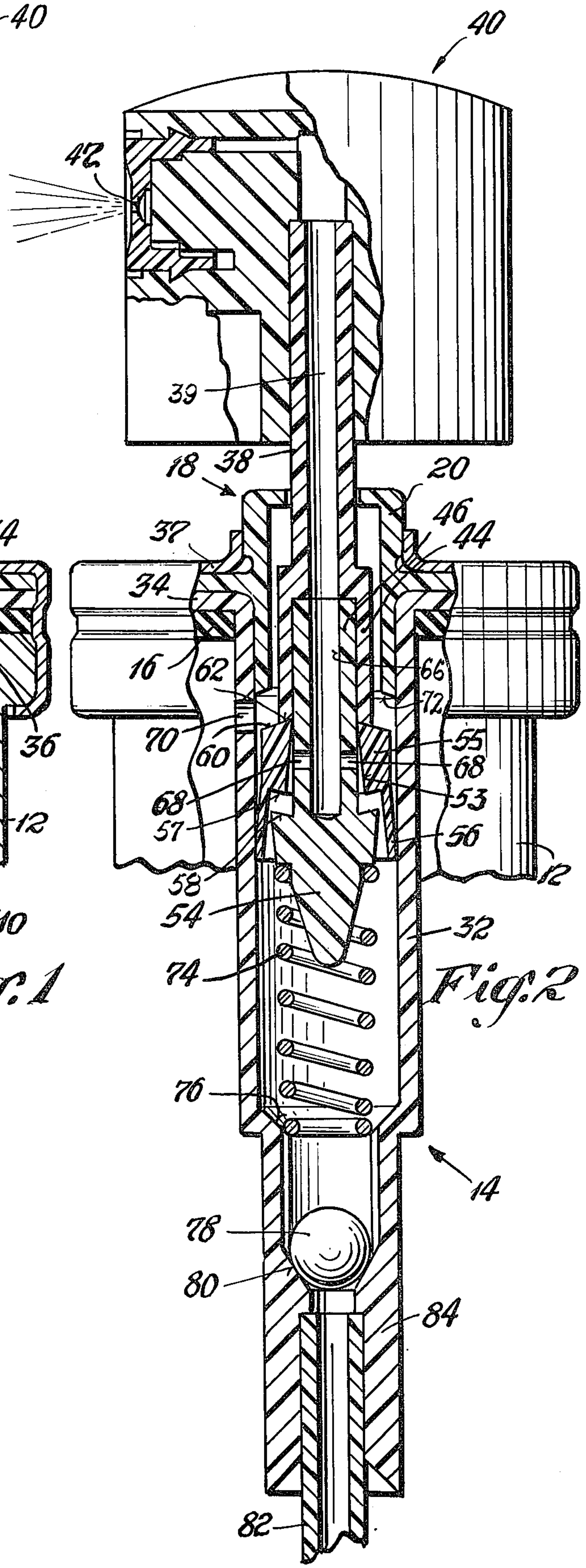
FIG. 2 is a view like that of FIG. 1, but showing the plunger and piston partially depressed, in positions occupied during the pumping operation wherein liquid is being discharged from the spray-head carried by the plunger.

Slidably carried in the bushing 18 is a hollow plunger 38 having a discharge passage 39, the upper end of the plunger carrying a depress button 40 having an orifice 42 of conventional construction. The shank of the plunger 38 has a portion 44 of enlarged diameter and bore, in which there is press-fitted the upper end 46 of a valve stem 48 having a slide bearing surface 49. The stem includes side orifices 68 which provide communication between the hollow of the plunger 38 and the bore of the piston during discharge, as will be explained below. Slidably carried on the stem 48 is a hollow piston 52 having a bore 53, a body portion 55 and a skirt portion 56. The piston is movable between high and low positions on the plunger 38. The high position of the piston 52 with respect to the plunger 38 is shown in FIG. 2, whereas the low position is shown in FIG. 1. Similarly, the raised and lowered positions of the piston 52 with respect to the cylinder 32 are shown in FIGS. 1 and 2 respectively.

In accordance with the present invention there is provided a double-action end squeeze of the piston, including a novel sealing arrangement between the lower part of the plunger 38 and the body portion 55 of the piston for simultaneously controlling the discharge of liquid from the pump cylinder 32 and for eliminating leakage of the liquid between the walls of the piston bore 53 and the adjacent surface of the cylindrical plunger wall.

According to the invention, the piston bore is of non-uniform, slightly conical configuration, the diameter of the bore being smallest at the top of the piston body portion 55, and the bore tapering to an increased dimension at the lower part of the body portion. The non-uniform diameter accomplishes two objectives. It provides adequate clearance for the liquid from the pump cylinder to flow between the piston bore and plunger wall, out through the side orifices 68 of the plunger during discharge of the dispenser, as in FIG. 2. Also, the resilience of the piston causes a relatively small area of the bore, namely the area adjacent the top thereof, to sealingly engage the wall of the plunger at all times. Since a small contact area is involved, the pressure between the two parts is relatively great, resulting in a tight seal during both storage and discharge of the dispenser. By such an arrangement, the likelihood of leaks is greatly minimized.

The valve stem 48 has an enlargement or valve head 54 located within the resilient skirt 56 of the piston 52 and engageable with an annular cooperable valve seat 57 thereof (FIG. 2) to seal off the bore of the piston for the raised, non-discharging position of the pump as shown in FIG. 1. Also, according to the invention, the valve seat 57 is of generally conical configuration, sloping downwardly as shown in FIG. 2 as the piston body is traversed in a radially inward direction; associated with the valve seat 57 is a cooperable conical sealing surface 58 for the valve head (FIG. 2), this surface having generally the same curvature as that of the seat 57; the two form a tight seal when the plunger is in the non-discharging position of FIG. 1. As a result, due to the unique disposition of the surfaces 57, 58, the surface 58 tends to squeeze the body portion 55 of the piston 52 in a radially inward direction such that the walls of the upper portion of the bore of the piston more tightly engage the cylindrical wall of the plunger than would be the case without the particular arrangement of the surfaces 57, 58. This is an important feature of the invention, since it minimizes leakage which would otherwise occur through the bore 53 of the piston and out through the space between the walls of the plunger 38 and the bushing 18. I have found that the combination of the conical surfaces 57, 58, and the piston bore of non-uniform, tapered diameter, provides excellent resistance to undesirable leakage through the piston bore. During molding of the parts, the smallest diameter portion of the piston bore is made several thousandths of an inch smaller than the outer diameter of the plunger stem, such that the latter forcibly expands the resilient piston during assembly.

The lower plunger bore, specifically the valve stem bore, is designated by the numeral 66. As mentioned above, the lateral passages 68 provide communication between the cylinder chamber adjacent the piston valve seat 57 and the plunger discharge passage 39 when the head 54 is disengaged from the seat 57 as illustrated in FIG. 2.

At its upper end, the piston 52 has a valve 60 which is engageable with a conical shoulder or outer valve seat 62 on the plunger 38, to effect a valving action and also a radially inward squeeze so as to further seal off the bore of the piston 52 when the latter is in the high position on the plunger 38 as in FIG. 2. For such position of the piston 52, the valve head 54 will be disengaged from the piston valve seat 57, thus enabling liquid to flow from the chamber of the cylinder 32 past the seat 57 and through the lateral passages 68, into the discharge passages 66 and 39 during the depressing movement of the piston and plunger.

To provide for venting of air into the container 10 for replacing the liquid being discharged therefrom, the cylinder 32 is provided with a side vent opening 70 in its upper portion; the bushing 18 has an annular valve seat or sealing shoulder 72 (FIG. 2) of conical configuration which is cooperable with the upper edge or valve 60 of the piston 52 to prevent leakage of any fluid from the container vent opening 70 into the space between the portion 44 of the plunger and the bushing 18 in the event the dispenser is placed on its side.

The pump construction is completed by a compression coil spring 74 engaging the underside of the valve head 54 and also an internal shoulder 76 in the cylinder 32, and by a check valve 78 which rests by gravity against a cooperable seat 80 in the lower end portion of the cylinder 32. A dip tube 82 is press-fitted into a nipple 84 at the bottom end of the cylinder 32, as shown.

Operation of the pump construction is as follows: Referring to FIG. 1, showing the non-dispensing or storage position of the pump, the spring 74 maintains the valve head 54 in engagement with the valve seat 57 of the piston 52, and maintains the piston valve 60 engaged with the sealing shoulder 72 of the bushing 18. Liquid in the cylinder 32 will be held captive, since it can not escape past the valve head 54; nor can liquid from the location of the vent opening 70 pass the valve 60. The conical configuration of the surface 58 transmits through the seat 57, a radially inward force to the body portion 55 of the piston, causing the upper portion of the walls of the piston bore to sealingly engage the cylindrical wall of the plunger stem 48. At the beginning of downward movement of the plunger 38, the valve head 54 will first be separated from the seat 57 of the piston thus removing the radial inward force on the piston, and the valve 60 of the latter will then be engaged by the plunger valve surface 62, such engagement of the valve 60 and conical surface 62 causing the upper portion of the walls of the piston bore to again sealingly engage the slide bearing surface of the plunger stem as the plunger is depressed. Continued downward movement of the plunger will now carry with it the piston 52 whereupon a pumping action will occur, forcing liquid from the cylinder 32 past the valve head 54 and into the lateral passages 68, and thence to the passages 66 and 39 of the plunger for discharge from the spray orifice 42. Upon the upstroke of the plunger 38, liquid will be sucked into the cylinder through the dip tube 82 past the ball check valve 78; this will be accompanied by an inrush of air past the plunger 38 and sealing shoulder 72 of the bushing 18 and through the vent opening 70 of the cylinder into the container 10. The inrush of air will cease upon the engagement of the seat 60 with the shoulder 72, whereupon the dispenser will appear in the storage position of FIG. 1, ready for subsequent actuation. Accordingly, in the nondispensing position of FIG. 1, the piston walls are urged radially inward by the valve head 54. During discharge, the force from the head is removed, and the piston walls are urged radially inward by the plunger 44. By the above arrangement, leakage of liquid from the cylinder into the area between the walls of the piston bore and the walls of the plunger is greatly minimized, resulting in less product waste and resulting in a dispenser which is simpler and more convenient to use.

It will now be seen from the foregoing that I have provided a unique, especially simple and workable, effectively leak-proof pump construction for small hand-held dispensers, wherein the parts are all of simple configuration and can be readily molded of plastic substance in simple mold cavities. The assemblage of the parts is easily and quickly effected. The piston 52 can be installed on the stem 48 of the plunger after which the remainder of the plunger is pressed over the stem. After this assemblage is installed in the cylinder, the bushing 18 is pressed on, and the completed pump secured to the filled container by crimping the ferrule 37 over the neck thereof.

The improved pump construction as illustrated and described herein is characterized by a double-ended squeeze applied to the piston in a manner to cause the latter to more snugly embrace and seal against the plunger shank, yet the piston becomes freely movable once the plunger starts to shift downward. Thus an easy action and an effective seal is simultaneously obtained.

Variations and modifications are possible without departing from the spirit of the invention.

I claim:

1. A pump construction for hand-held dispensers and the like, comprising in combination:

(a) a cylinder, (b) means providing an annular sealing shoulder on the cylinder inner wall, (c) a hollow plunger reciprocatively mounted at the top of the cylinder and movable in the direction of its axis in the upper portion of the cylinder, said plunger having a discharge passage, carrying a valve head at its lower portion, and having a slide bearing surface above the valve head, (d) a resilient hollow annular piston carried by the plunger and movable in the cylinder between raised and lowered positions, said piston having a body portion provided at it top end with a bore having a smaller diameter at the top of the piston, the smaller diameter portion of the piston bore being sealingly engageable with and slidable longitudinally on the bearing surface of the plunger between high and low positions thereon and constituting a small high-pressure area which continuously presses against said bearing surface, said piston having a lower skirt portion engageable with the cylinder walls, and having a cooperable valve seat engageable with the valve head when the piston is in said low position on the plunger, and (e) means providing a fluid passage from the cooperable valve seat of the piston to the discharge passage of the plunger when the cooperable valve seat is disengaged from the valve head, (f) said plunger having an annular, outer valve seat located above its slide bearing surface and engageable with the upper end of the piston body portion when the piston is in its high position on the plunger, (g) the upper end of the piston body portion constituting a valve which engages the sealing shoulder in the cylinder when the piston is in its raised position in the cylinder, (h) the bottom end of the piston body portion being conical, (i) said valve head of the plunger having a conical valve surface engageable with the bottom end of the piston body portion and squeezing said bottom end radially inward to improve the seal of the top end of the piston body portion against the bearing surface of the plunger during storage and during raising movement of the plunger.

2. A pump construction as in claim 1, wherein:

(a) the bore of the piston body portion is tapered, having a smaller diameter at the top of the body portion, (b) said valve head transmitting radially-inward forces to the smaller diameter bore of the piston body portion.

3. A pump construction as in claim 1, wherein:

(a) the outer valve seat of said plunger is of generally conical configuration, (b) the upper end of the piston body portion which constitutes the valve also being of conical configuration, (c) the outer valve seat of said plunger transmitting to the upper end of the piston body portion a radially inward force during discharge of the dispenser, when the valve head is removed from said cooperable valve seat of the piston, (d) said upper end of the piston body portion thereby sealingly engaging the slide bearing surface of the plunger and eliminating leakage during discharge of the dispenser.

* * * * *